United States Patent
Shen et al.

(10) Patent No.: US 12,032,106 B2
(45) Date of Patent: Jul. 9, 2024

(54) X-RAY DETECTORS WITH PLASTIC HOUSINGS

(71) Applicant: Varex Imaging Corporation, Salt Lake City, UT (US)

(72) Inventors: Xiaoyang Shen, Salt Lake City, UT (US); Marcelo C. Costa, Draper, UT (US); Matthew McCabe, Kearns, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 277 days.

(21) Appl. No.: 17/234,645

(22) Filed: Apr. 19, 2021

(65) Prior Publication Data

US 2022/0317320 A1 Oct. 6, 2022

Related U.S. Application Data

(60) Provisional application No. 63/169,805, filed on Apr. 1, 2021.

(51) Int. Cl.
*G01T 1/24* (2006.01)
*G01T 1/20* (2006.01)
*G12B 9/04* (2006.01)

(52) U.S. Cl.
CPC ............ *G01T 1/244* (2013.01); *G01T 1/2019* (2020.05); *G12B 9/04* (2013.01)

(58) Field of Classification Search
CPC ............................... G01T 1/244; G01T 1/2019
USPC ....................................................... 250/361 R
See application file for complete search history.

(56) References Cited

U.S. PATENT DOCUMENTS

| | | | |
|---|---|---|---|
| 8,680,475 B2* | 3/2014 | Konkle | G01T 1/2018 250/370.09 |
| 9,104,097 B2 | 8/2015 | Suwa | |
| 11,255,982 B2* | 2/2022 | McLaughlin, II | G01T 1/20189 |
| 2007/0272873 A1* | 11/2007 | Jadrich | G01T 1/20 250/370.11 |
| 2010/0246771 A1* | 9/2010 | Hawver | G03B 42/02 378/98.2 |
| 2011/0133096 A1 | 6/2011 | Konkle et al. | |

(Continued)

FOREIGN PATENT DOCUMENTS

| | | |
|---|---|---|
| JP | 2004-141473 | 5/2004 |
| JP | 2013-007712 | 1/2013 |

OTHER PUBLICATIONS

PCT/US2022/023156, International Search Report dated Jul. 25, 2022.

(Continued)

*Primary Examiner* — Carolyn Fin
(74) *Attorney, Agent, or Firm* — Laurence & Phillips IP Law

(57) ABSTRACT

Some embodiments include an x-ray detector, comprising: a plastic housing including a conductive coating; a two-dimensional sensor array disposed in a within the plastic housing and configured to generate image data in response to incident x-rays; a front plate connected to the plastic housing, the front plate and the plastic housing forming an enclosure surrounding the two-dimensional sensor array; wherein the conductive coating and the front plate form at least part of an electromagnetic interference shield around the two-dimensional sensor array.

17 Claims, 11 Drawing Sheets

(56) References Cited

U.S. PATENT DOCUMENTS

| | | |
|---|---|---|
| 2011/0236655 A1* | 9/2011 | Nakano .................. B05D 7/22 428/212 |
| 2014/0084161 A1 | 3/2014 | Takatori |
| 2015/0342553 A1 | 12/2015 | Sato et al. |
| 2019/0353810 A1 | 11/2019 | Bogumil et al. |

OTHER PUBLICATIONS

PCT/US2022/023156, Written Opinion dated Jul. 25, 2022.
PPG Industrial Coatings, Electronic Materials Group, Series 599-B3755, Silver-Coated Copper Conductive Coating (2014).
U.S. Appl. No. 18/261,106; Preliminary Amendment of Nov. 28, 2023.
U.S. Appl. No. 18/261,106; Examiner Interview Summary of Feb. 5, 2024.
U.S. Appl. No. 18/261,106; Non-Final Office Action of Feb. 14, 2024.

* cited by examiner

X-RAY DETECTORS WITH PLASTIC HOUSINGS

X-ray detectors are conventionally formed from metal housings. The metal housings provide rigidity to the detector to resist loads experienced during use, such as the weight of a patient on the x-ray detector during an imaging operation. Access panels or doors may be formed over an antenna within the metal housing as the antenna cannot communicate through the walls of the metal housing.

DETAILED DESCRIPTION

Some embodiments relate to x-ray detectors with plastic housings. A plastic housing may reduce a weight and/or cost of an x-ray detector. Various modifications to the x-ray detector with the plastic housing may improve electromagnetic interference performance, intrusion performance, physical load specifications, or the like.

Figure 1:
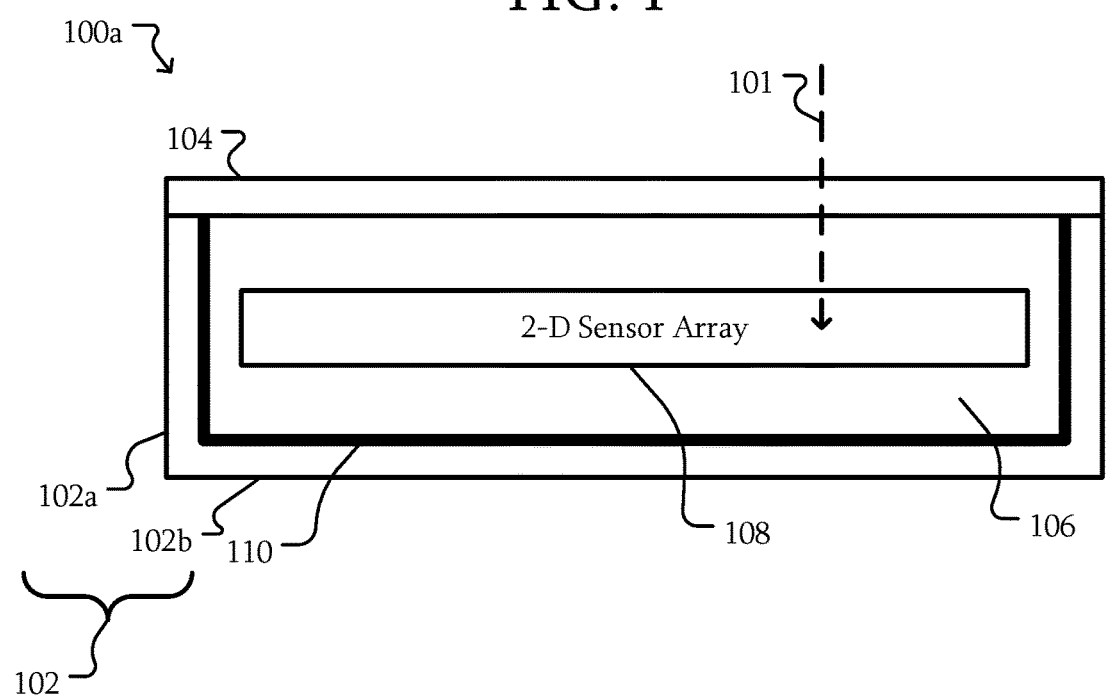
FIG. 1 is a block diagram of an x-ray detector with a plastic housing according to some embodiments.

FIG. 1 is a block diagram of an x-ray detector with a plastic housing according to some embodiments. In some embodiments, the x-ray detector 100a includes a plastic housing 102, a front plate 104, a two-dimensional sensor array 108, and a conductive coating 110.

The two-dimensional sensor array 108 is disposed in a within the plastic housing 102. The two-dimensional sensor array 108 is configured to generate image data in response to incident x-rays 101. For example, the two-dimensional sensor array 108 may include sensors such as direct conversion sensors, indirect conversion sensor, an amorphous silicon (a-Si) based imaging array a complementary metal oxide semiconductors (CMOS) based imaging array, a photon counting imaging array, or the like. The two-dimensional sensor array 108 may include a scintillator or x-ray conversion materials such as gadolinium oxysulfide ($Gd_2O_2S$; GOS; Gadox), gadolinium oxysulfide doped with terbium ($Gd_2O_2S$:Tb), cesium iodide (CsI), or the like. The direct conversion sensor may include x-ray conversion materials and/or semi-conducting materials such as cadmium telluride (CdTe). Although some materials have been used as examples, in other embodiments, the material may be different. The two-dimensional sensor array 108 may include electronic circuits such as readout circuits, communication circuits, processing circuits, or the like.

The plastic housing 102 is a structure formed from a material such as impact-resistant plastic, non-impact resistant plastic, polycarbonate, acrylic, or the like. Plastic includes a wide range of synthetic or semi-synthetic materials that use polymers as a main ingredient. The plastic housing 102 is configured to support various other components such as the front plate 104, the two-dimensional sensor array 108, antennas, batteries, or the like. These and/or other components may be part of the x-ray detector 100a.

The plastic housing 102 may include internal structural features such as ribs, depressions, grooves, posts, or the like to provide rigid and semi-rigid support to the housing. The plastic housing 102 may be formed in a variety of ways, such as molding, welding, gluing, or the like of various components. In a specific example the plastic housing 102 is formed by injection molding. The plastic housing 102 may include sidewalls 102a and a base 102b.

In some embodiments, the two-dimensional sensor array 108 is supported within the plastic housing 102. For example, standoffs, structures of the plastic housing 102, or the like may support the two-dimensional sensor array 108 within the plastic housing 102.

The front plate 104 is connected to the plastic housing 102. The front plate 104 and the plastic housing 102 form an enclosure surrounding the two-dimensional sensor array 108. As will be described in further detail below, the enclosure may be completely sealed once the front plate 104 is attached to the plastic housing 102 while in other embodiments, other structure, such as screws with seals, electrical connectors or contacts, or the like may be included in completely sealing the enclosure.

The front plate 104 may include a conductive surface, layer, coating, material, or the like. For example, the front plate 104 may include a carbon fiber plate. A conductive material, such as aluminum or the like may be embedded within the carbon fiber plate, attached to a side of the structure, such as the inner side, or the like. As a result, a conductive surface may extend across the major plane of the front plate 104.

The plastic housing 102 includes a conductive coating 110. The conductive coating 110 and the front plate 104 are electrically connected together and form at least part of an electromagnetic interference shield around the two-dimensional sensor array 108. In some embodiments the conductive coating may include a conductive paint such as copper (Cu) paint, silver (Ag) paint, nickel (Ni) paint, an alloyed conductive paint, a mixture paint, or the like. In some embodiments, the conductive coating may be a sprayable conductive coating that may be applied in an aerosol form. In some embodiments, the conductive coating may include a mild solvent compatible with a solvent sensitive material, such as polycarbonate, or polycarbonate material. In some embodiments, the conductive coating may include an alcohol base, such as ethyl alcohol. In a particular example, the conductive paint may include a silver-coated copper. In some embodiments, the conductive coating may be less than 12 mil ($^{12}/_{1000}$ of an inch or 300 microns [μm]), 8 mil (200 μm), 4 mil (100 μm), 2 mil (50 μm), 1 mil (25 μm), or 0.5 mil (12 μm).

The use of the plastic housing 102 rather than a metal housing may increase a probability of electromagnetic interference (EMI) affecting circuitry such as the two-dimensional sensor array 108. EMI may be particularly troublesome for x-ray detectors 100a. For example, x-ray detectors 100a and, in particular, the two-dimensional sensor array 108 may be very sensitive to EMI. A voltage difference of on the order of millivolts (mV) may introduce an artifact into an image generated by the x-ray detector 100a. If an artifact is introduced, a patient may need to be exposed again to x-rays to generate another image, increasing the dose delivered to the patient. The conductive coating 110 can provide effective shielding of EMI. In some embodiments, the conductive coating may have a sheet resistance of less than 0.1 ohm/square (Ω/□), 0.05 Ω/□, 0.025 Ω/□, 0.015 Ω/□, or 0.007Ω/□ per 25 μm or 1.0 mil. Sheet resistance is provided based on a 25 μm thickness, but can be lower with a thicker coating or higher with a thinner coating. In some embodiments, the conductive coating may have an electrical resistivity (ρ) of less than $5.0\times10^{-7}$ ohm meters (Ωm), $3.75\times10^{-7}$ Ωm, $1.1\times10^{-7}$ Ωm, $5.0\times10^{-8}$ Ωm, or $3.0\times10^{-8}$ Ωm at 20° Celsius (C.).

The use of the plastic housing 102 rather than a metal housing may decrease a weight of the x-ray detector 100a. In some embodiments, the x-ray detector 100a may be a mobile device, such as a portable flat panel detector. The x-ray detector 100a may be moved from location to location, inserted into a bucky, or otherwise manipulated by a user. The reduced weight may reduce a strain on a user.

In some embodiments, the conductive coating 110 may have a thickness that is within a range. For example, the thickness range may be from about 100 micrometers (μm) to about 300 μm. The actual thickness may vary based on manufacturing tolerances, structural features of the plastic housing 102, or the like. In some embodiments, the thickness is about 100 μm. In some embodiments, a thickness of the material is determined by a desired level of EMI protection. For some EMI protection requirements, a thickness of 25 μm may be too thin, such as a level of EMI shielding for the two-dimensional sensor array 108. In addition, a coating that is too thick, such as greater than 300 μm may result in flaking. In some embodiments, depositing a layer of the conductive coating that is about 200 μm may reduce or eliminate flaking while still providing a sufficient level of EMI protection for the two-dimensional sensor array 108.

In some embodiments, the conductive coating 110 extends across all or substantially all internal surfaces of the plastic housing 102. In other embodiments, the conductive coating 110 may have gaps that are small enough such that EMI is still sufficiently reduced. In other embodiments, gaps may be present in the conductive coating 110 on various features of the plastic housing 102 for attachment of structural components, connectors, contacts, interfaces, or the like. As will be described in further detail below, a conductive material such as copper tape (e.g., copper foil shielding tape) may be applied over such features to mask the gap.

Figure 2:
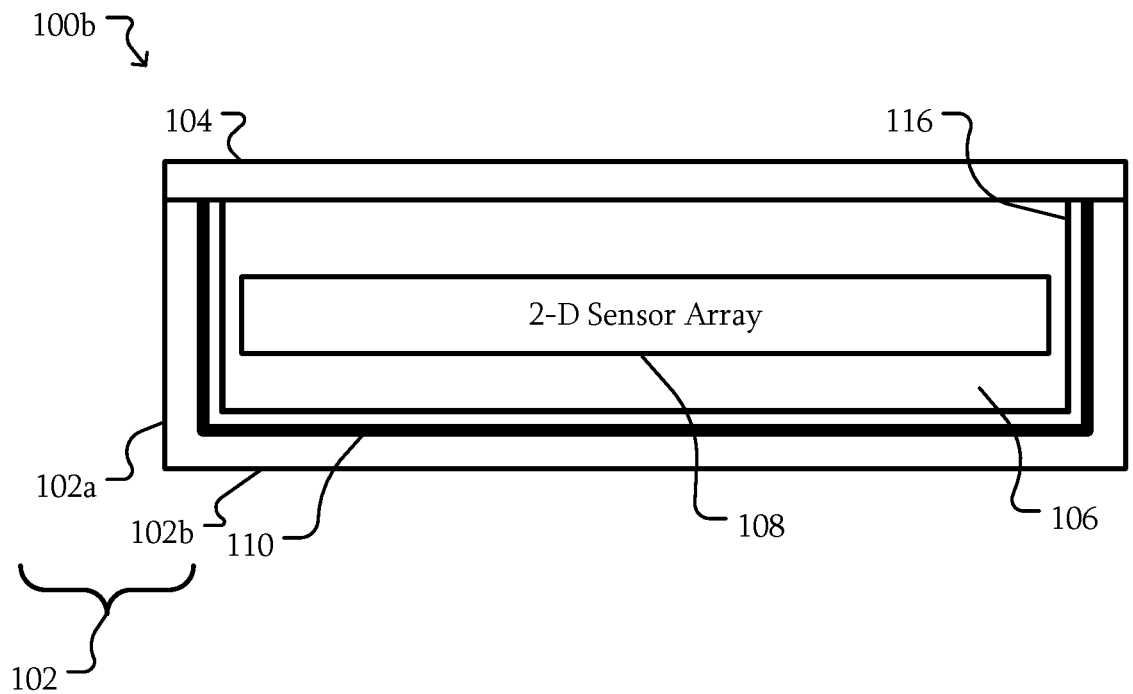
FIG. 2 is a block diagram of an x-ray detector with a plastic housing with a coating according to some embodiments.

FIG. 2 is a block diagram of an x-ray detector with a plastic housing with a coating according to some embodiments. In some embodiments, the x-ray detector 100b may be similar to the x-ray detector 100a or the like. However, a coating 116 may be deposited on at least part of the conductive coating 110. The coating 116 may reduce a probability that the conductive coating 110 may flake. Thus, the use of the coating 116 may maintain the EMI shielding performance of the conductive coating 110. The coating 116 may not be present over regions of the conductive coating 110 where contact to the conductive coating 110 is formed. The coating 116 may include a clear coat paint including polyurethane, acrylic, or the like. In some embodiments, the coating 116 may be translucent or opaque.

Figure 3:
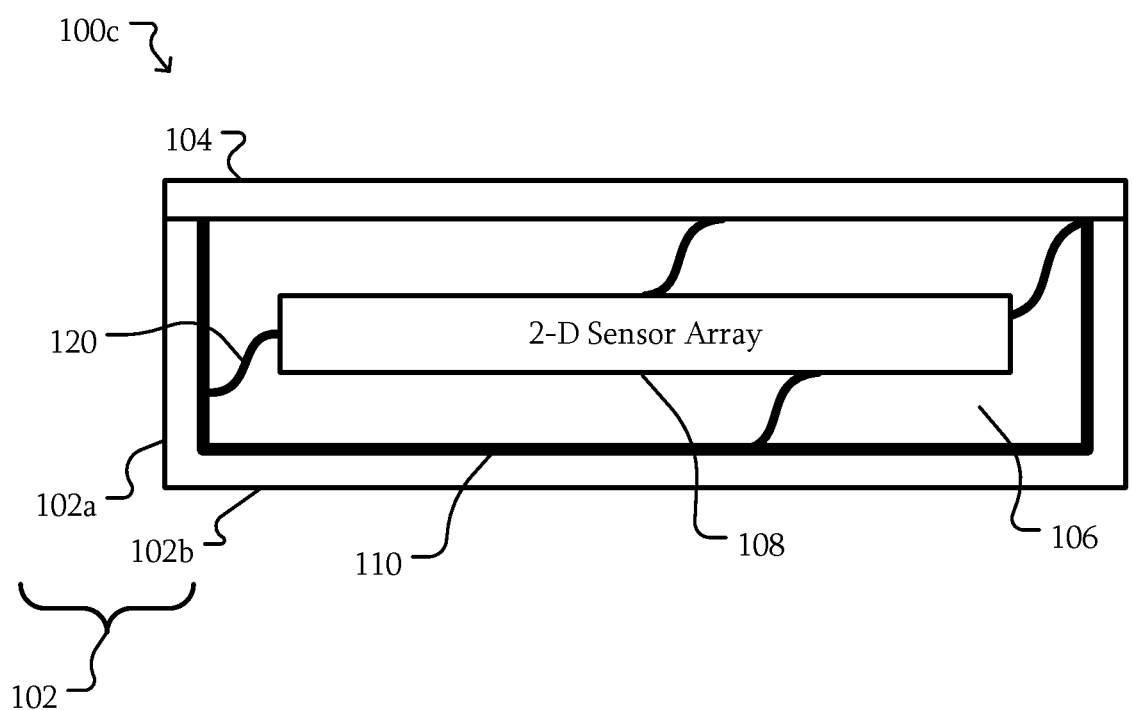
FIG. 3 is a block diagram of an x-ray detector with a plastic housing with multiple electrical connections to an electromagnetic interference shield according to some embodiments.

FIG. 3 is a block diagram of an x-ray detector with a plastic housing with multiple electrical connections to an electromagnetic interference shield according to some embodiments. In some embodiments, the x-ray detector 100c may be similar to the x-ray detectors 100a-100b or the like. However, conductive straps 120 may electrically connect the conductive coating 110 to the two-dimensional sensor array 108. For example, various ground terminals, contacts, or the like on the two-dimensional sensor array 108 may be electrically connected to the conductive coating 110 and/or the front plate 104 through the conductive straps 120. While four conductive straps 120 are used as an example, in other embodiments, two, three, or five or more conductive straps 120 may electrically connect the two-dimensional sensor array 108 to the conductive coating. The number of conductive straps 120 may be based on the desired degree of grounding for the two-dimensional sensor array 108.

In addition, while different locations for the connection of the conductive straps 120 have been used as examples, in other embodiments, the locations may be different. For example, the connection may be made to screw terminals of the plastic housing 102 that are coated with the conductive coating 110. The conductive straps 120 may be electrically connected to various regions of the conductive coating 110 on the plastic housing such as the sidewalls 102a and the base 102b.

The conductive straps 120 may take a variety of forms. For example, the conductive straps 120 may include copper tape, wires, braided conductors, or the like. In some embodiments, the conductive straps 120 may be electrically connected to one or more of the conductive coating 110, the two-dimensional sensor array 108, and/or the front plate 104 using conductive adhesive, such as an electrically conductive epoxy.

Figure 4:
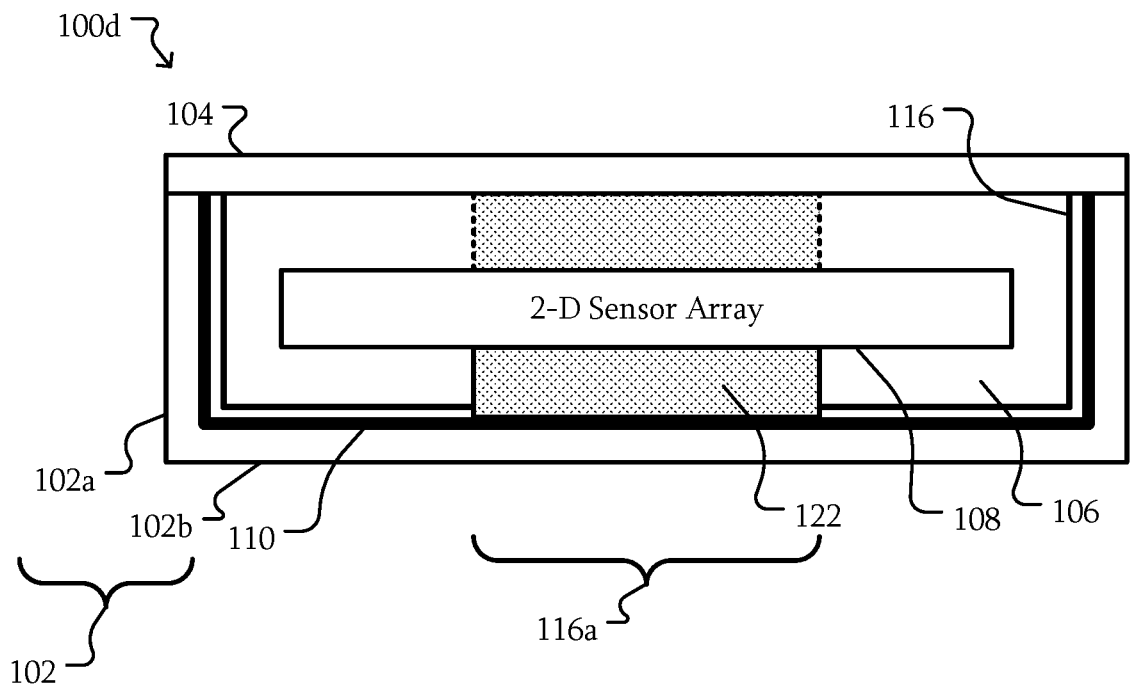
FIG. 4 is a block diagram of an x-ray detector with a plastic housing with conductive elastically deformable material according to some embodiments.

FIG. 4 is a block diagram of an x-ray detector with a plastic housing with conductive elastically deformable material according to some embodiments. In some embodiments, the x-ray detector 100d may be similar to the x-ray detectors 100a-c or the like. However, a conductive elastically deformable material 122 is electrically connected between the two-dimensional sensor array 108 and at least one of the conductive coating and the front plate. As illustrated, the conductive elastically deformable material 122 is disposed between the two-dimensional sensor array 108 and the base 102b of the plastic housing 102. The conductive elastically deformable material 122 may be compressed when installed to make contact with both the conductive coating 110 and conductive contacts of the two-dimensional sensor array 108.

In some embodiments, when a coating 116 is present, a gap 116a may be present in the coating 116 to allow electrical contact to the conductive coating 110 by the conductive elastically deformable material 122.

The conductive elastically deformable material 122 may take a variety of forms. For example, the conductive elastically deformable material 122 may include an open-cell foam with metal coated fibers. In another example, the conductive elastically deformable material 122 may include an anisotropic conductive film, an isotropic conductive adhesive, or the like.

Figure 5:
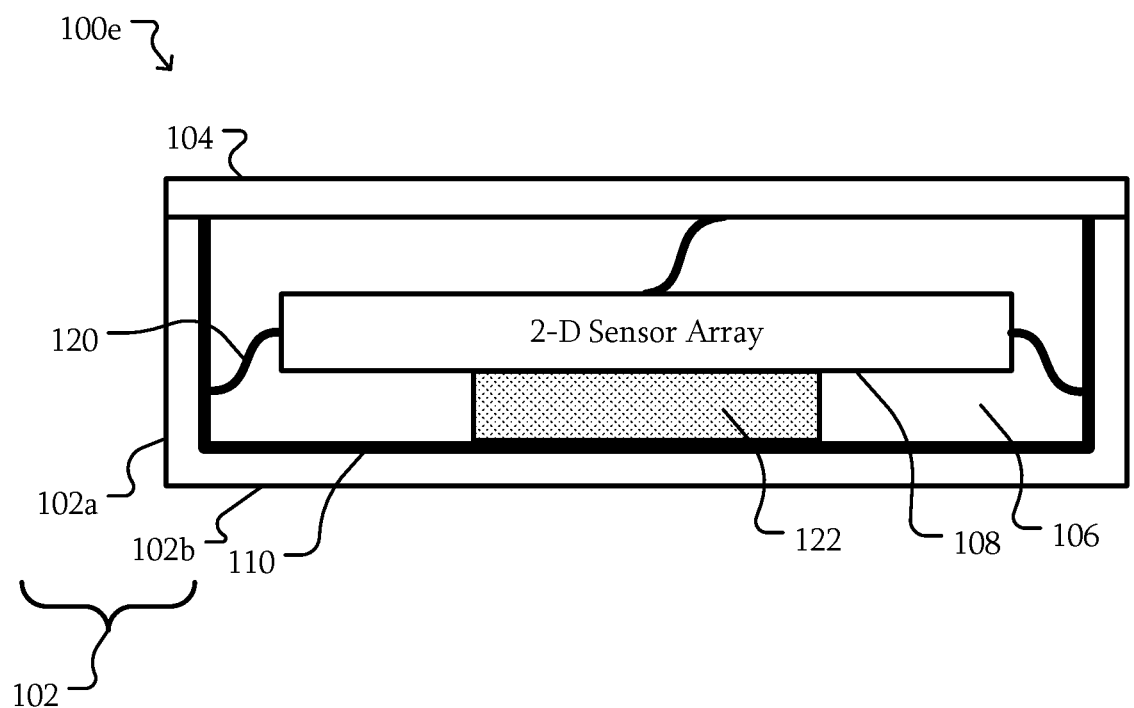
FIG. 5 is a block diagram of an x-ray detector with a plastic housing with multiple electrical connections to an electromagnetic interference shield and conductive elastically deformable material according to some embodiments.

FIG. 5 is a block diagram of an x-ray detector with a plastic housing with multiple electrical connections to an electromagnetic interference shield and conductive elastically deformable material according to some embodiments. In some embodiments, the x-ray detector 100e may be similar to the x-ray detectors 100a-d or the like. However, the both the conductive straps 120 and the conductive elastically deformable material 122 may be used to electrically connect the two-dimensional sensor array 108 to the EMI shield. Having multiple points of contact distributes the grounding load across the conductive coating 110. As a result, a lower thickness of the conductive coating 110 as compared to a metal housing may have a reduced impact on performance.

Figure 6A:
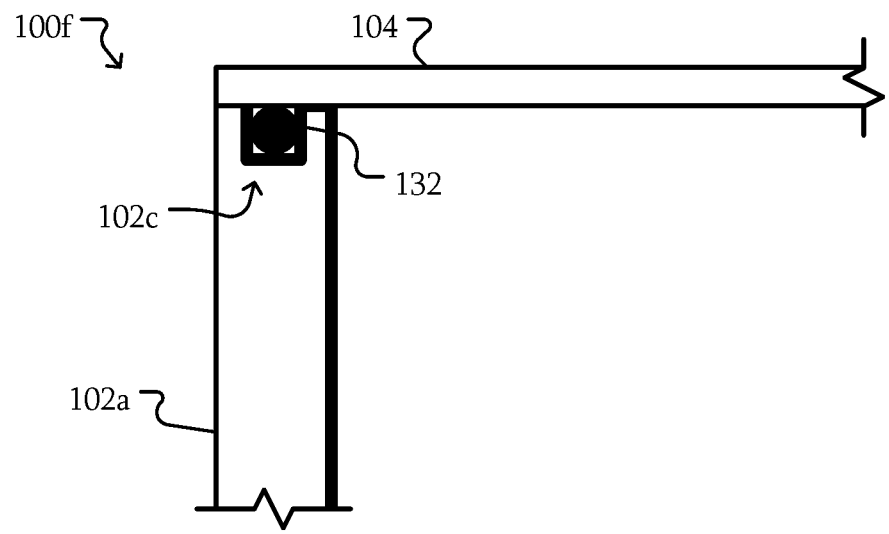
FIGS. 6A-6B are block diagrams of x-ray detectors with a plastic housing and a conductive gasket according to some embodiments.
Figure 6B:
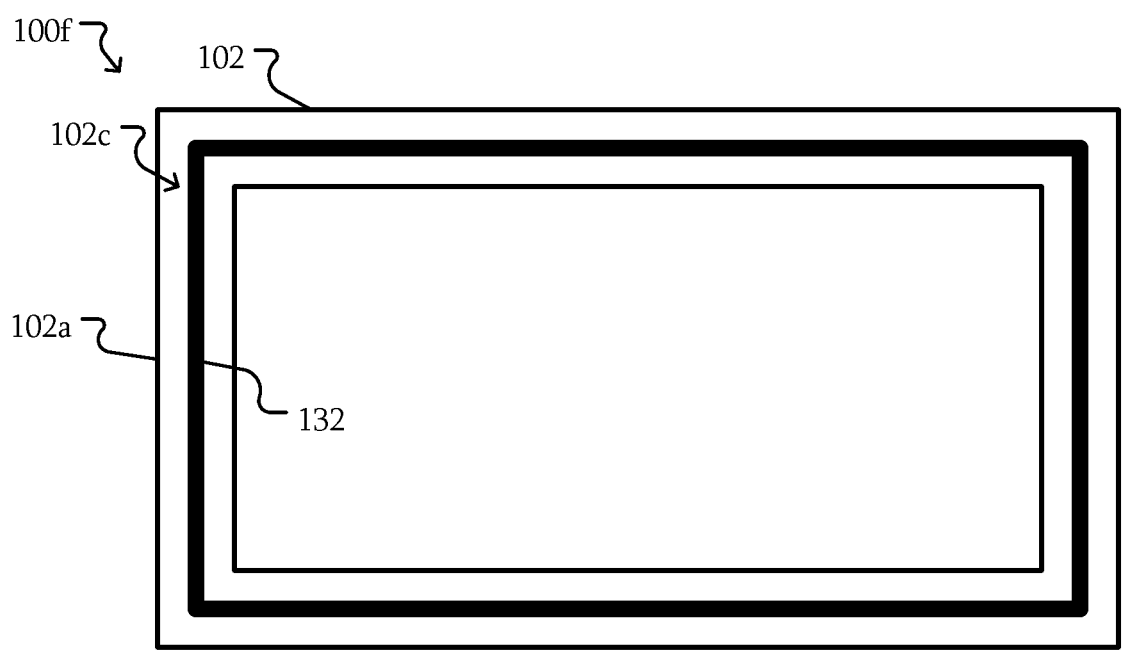

FIGS. 6A-6B are block diagrams of x-ray detectors with a plastic housing and a conductive gasket according to some embodiments. FIG. 6A is an expanded view of the interface between a sidewall 102a and the front plate 104. FIG. 6B is an overhead view of the plastic housing 102 without the front plate 104. Referring to FIGS. 6A and 6B, in some embodiments, the x-ray detector 100f may be similar to the x-ray detectors 100a-e or the like. However, a conductive gasket 132 is disposed between the front plate 104 and the plastic housing 102 and electrically connected to the front plate 104 and the conductive coating 110 and sealing an interface between the front plate 104 and the plastic housing 102.

Here, the sidewall 102a of the plastic housing has a groove 102c that is continuous around the perimeter of the plastic housing 102. The conductive coating 110 may extend into the groove. The conductive gasket 132 is disposed in the groove 102c such that when the front plate 104 is attached to the plastic housing 102, the conductive gasket 132 is compressed and makes contact to both the front plate 104 and the conductive coating 110.

While a groove 132 has been used as an example, in other embodiments, the conductive gasket 132 may take different forms. For example, the conductive gasket 132 may include a conductive sheet formed to match the shape of the sidewalls 102a of the plastic housing. Regardless, the conductive gasket 132 may form an electrical connection around the perimeter of the plastic housing 102 to the front plate 104. This connection may maintain the EMI shield across the transition from the conductive coating 110 to the front plate 104.

The conductive gasket 132 may be formed from a variety of materials. In some embodiments, the conductive gasket 132 is formed from nickel, graphite, and silicon. In some embodiments, the conductive gasket 132 may include a conductive elastomer. For example, the conductive gasket 132 may use a fluorosilicone binder.

Figure 7A:
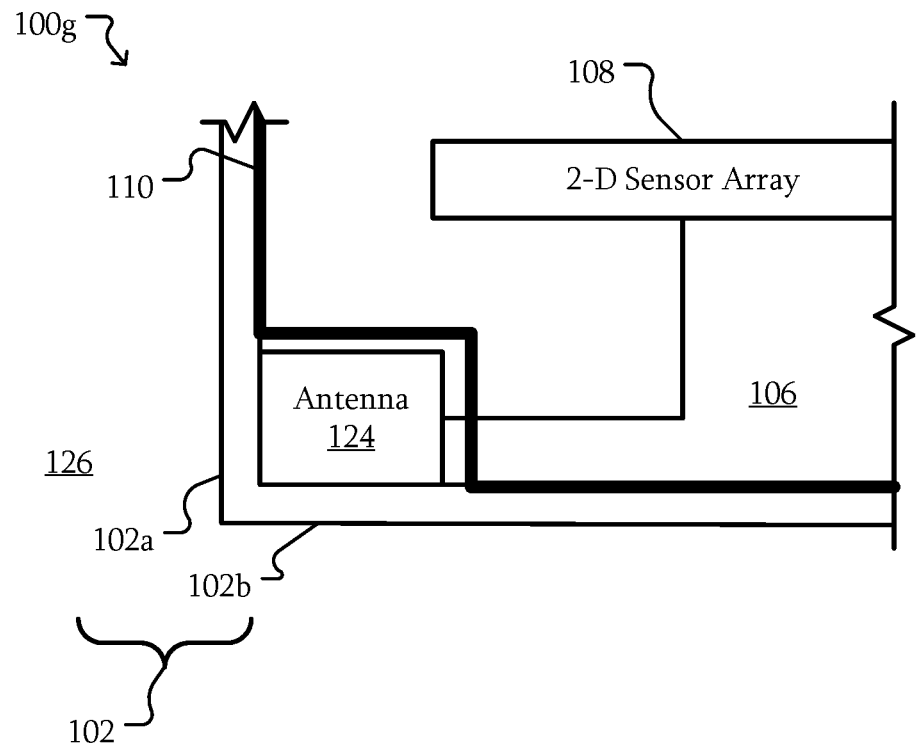
FIGS. 7A-7B are block diagrams of x-ray detectors with a plastic housing and an antenna according to some embodiments.
Figure 7B:
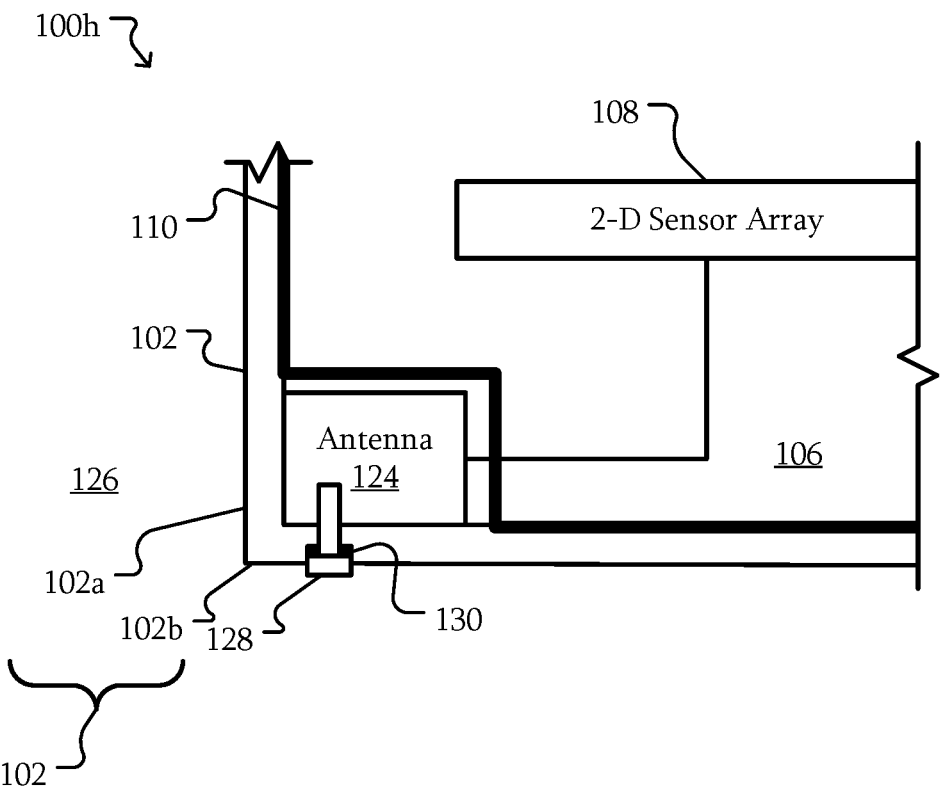

FIGS. 7A-7B are block diagrams of x-ray detectors with a plastic housing and an antenna according to some embodiments. Referring to FIG. 7A, In some embodiments, the x-ray detector 100g may be similar to the x-ray detectors 100a-f or the like. However, the x-ray detector 100g includes an antenna 124 electrically connected to the two-dimensional sensor array 108. The antenna 124 may allow for wireless communications between the x-ray detector 100g and an external computer. For example, the antenna 124 may be an antenna for WiFi (i.e., Institute of Electrical and Electronics Engineers (IEEE) 802.11-2020 or earlier), Bluetooth (e.g., IEEE 802.15.1 or Bluetooth 5.2 or earlier), or other wireless communication standards.

However, for the antenna 124 to be able to transmit wireless signals, the antenna 124 should be outside of the EMI shield. Accordingly, the conductive coating 110, conductive tape, a metal housing, or the like may surround the antenna 124 on the enclosure 106 side of the antenna 124. Although the conductive coating 110 is illustrated as being disposed on the antenna 124, the conductive material forming the EMI shield in the region around the antenna 124 may be formed by a combination of conductive structures as described above. As a result, the EMI shield may be continuous and allow for the antenna 124 to be outside of the EMI shield.

In some embodiments, the antenna 124 is disposed within the enclosure 106 such that a wall of the plastic housing 102 is disposed between the antenna 124 and a region 126 external to the enclosure 106. In this example, both the sidewall 102a and the base 102b are disposed between the antenna 124 and the external region 126. In particular, the antenna 124 is within the plastic housing 102. In some embodiments, there is no access to the antenna 124. That is, there is no opening, door, hatch, or the like through which the antenna 124 may be accessed through the local region of the plastic housing 102. As will be described in further detail below, this lack of access may aid in sealing the enclosure 106.

In some embodiments, using a plastic housing 102 allows for easier placement of the antenna 124. In some embodiments, the antenna 124 may be disposed along an edge of the plastic housing 102. However, the lack of a need for access to the antenna 124 or a separate structure to seal the antenna 124, such as a plastic cover on a metal housing, allows for the antenna 124 to be moved to any desired position without considering where such access may need to be created in the plastic housing 102, as the plastic housing does not impede radio or wireless transmissions.

Referring to FIGS. 7A and 7B, in some embodiments, the antenna 124 may be attached to the housing in different ways. In the x-ray detector 100g, the antenna 124 may be attached to the plastic housing 102 using adhesive, fasteners that do not fully penetrate the plastic housing 102, or the like. Access to attach the antenna 124 may be wholly within the plastic housing 102.

In other embodiments, in the x-ray detector 100h, the antenna 124 may be attached to the plastic housing 102 using fasteners 128, such as screws, bolts, or the like. In some embodiments, a seal 130 may be disposed between the fastener 128 and the plastic housing 102.

In some embodiments, the various features described above may contribute to a better performance with respect to ingress. Referring back to FIGS. 1, 6A, and 6B, in some embodiments, the plastic housing 102 is a continuous structure with only a first opening configured to receive the front plate 104. For example, the plastic housing 102 may have only one opening that is sealed by the gasket 132 and front plate 104.

In other embodiments, the plastic housings 102 described herein may have other openings. However, the number of openings and their character may be reduce a probability of infiltration of dust, water, or the like. Conventional x-ray detectors may be capable of meeting an Ingress Protection Code level of IP56 where the x-ray detector may be protected somewhat from dust (e.g., dust protected with limit ingress) and water jets (e.g., 12.5 mm nozzle water spray from any direction). Ingress Protection Code level refers to the protection against solid ingress represented by the first digit (e.g., 5 in IP56) and liquid ingress represented by the second digit (e.g., 6 in IP56). However, the x-ray detector with an IP56 cannot be submerged in a liquid, such as water. An x-ray detector 100 as described herein may meet or exceed Ingress Protection Code level of conventional x-ray detectors with an ingress of IP57 (where 7 refers to immersion in water for 30 minutes at 1 meter), IP67 (where 6 refers to dust tight with no ingress of dust for 2 to 8 hours), or IP68 where the x-ray detector 100 is dust tight and the x-ray detector 100 may be submerged or immersed in 1 meter or more of water for at least 60 minutes).

Referring to FIG. 7A, when the antenna 124 is wholly within the plastic housing 102, an ingress point is eliminated. That is, conventional x-ray detectors may have a door, panel, or the like made of plastic that covers the antenna within a metal housing. This door is necessary as the metal housing would otherwise block wireless transmission from the antenna. In contrast, with the antenna 124 wholly within the plastic housing 102, no cover is needed to allow the antenna 124 to communicate wirelessly. Referring to FIG. 7B, even when fasteners 128 are accessible external to the plastic housing 102, the interface is much easier to seal using the seal 130 than an irregular, curved, or otherwise complex door or hatch covering an antenna. Moreover, as such a door or hatch must be relatively thin, the difficulty of sealing the interface with a metal housing is exacerbated.

Figure 8:
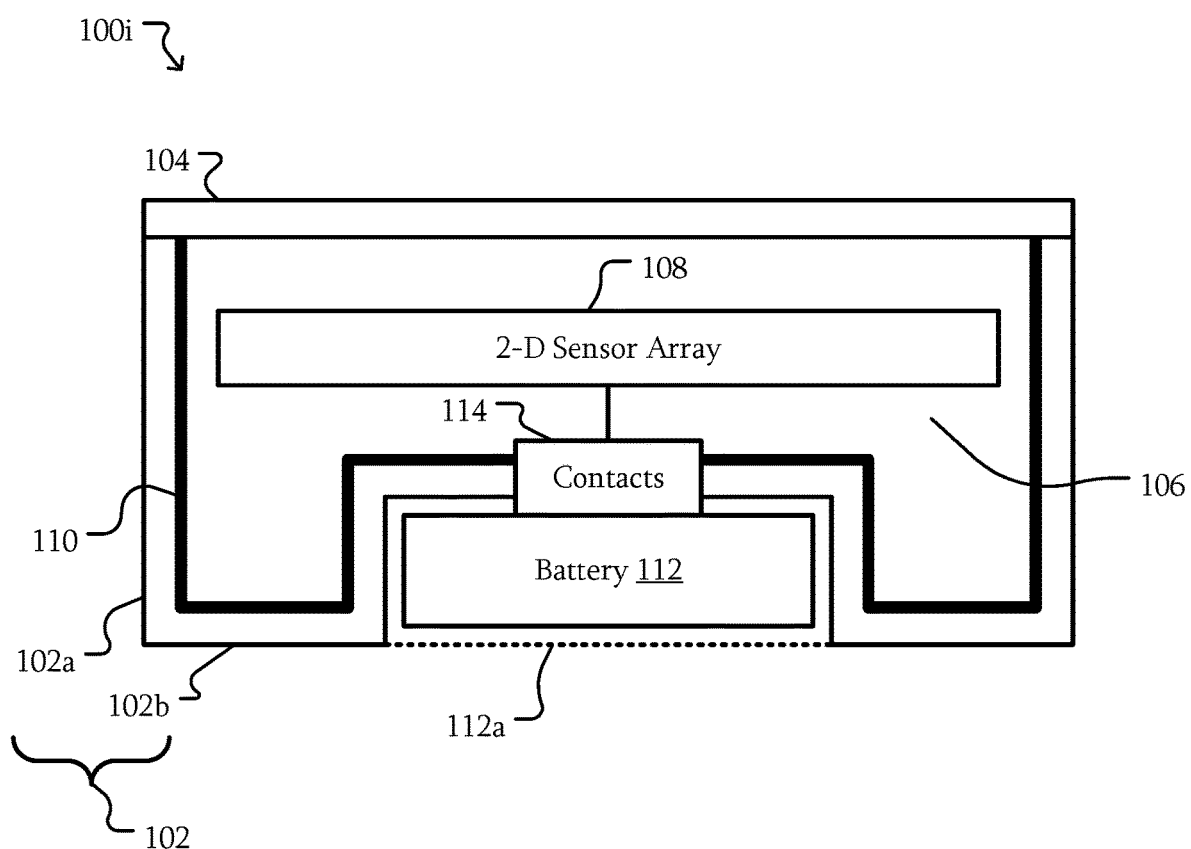
FIG. 8 is a block diagram of an x-ray detector with a plastic housing and a battery according to some embodiments.

FIG. 8 is a block diagram of an x-ray detector with a plastic housing and a battery according to some embodiments. In some embodiments, the x-ray detector 100i may be similar to the x-ray detectors 100a-h or the like. However, an externally accessible battery 112 may be part of the x-ray detector 100i. The battery 112 may be connectable to the two-dimensional sensor array 108 through contacts 114. The contacts 114 may penetrate the plastic housing 102. In some embodiments, a battery door 112a may conceal the battery 112 within the x-ray detector 100I.

In some embodiments, the plastic housing 102 may be a continuous structure with a first opening configured to receive the front plate 104 as described above. The only other opening in the plastic housing 102 may include an opening in which the contacts 114 to form an electrical connection between the battery 112 and the two-dimensional sensor array 108 are disposed. For example, the battery contacts 114 may include pogo pins in a header or other structure. That structure may be sealed to the plastic housing 102 at that opening. For example, U.S. patent application Ser. No. 16/730,953 ("'935 Application"), entitled "Removable Battery Connector Adapter," filed on Dec. 30, 2019, which is incorporated by reference in its entirety, provides an example of battery contacts 114 being sealed with a metal housing, which can also be used with a plastic housing 102.

Although the battery contacts 114 have been described as an example of an electrical connection that passes through the plastic housing 102, in other embodiments, other electrical connections may pass through. For example, a service port, ad universal serial bus port, a power connector, or the like may be present. Each of these connectors, ports, or the like may be formed to create a seal in the corresponding opening in the plastic housing 102. However, the number of seals, potential locations for ingress of dust and/or water, or the like may be reduced. In addition, the geometry of such penetration of the plastic housing 102 and the seals may be less complex, decreasing a probability of a failure of the seal. A gap of as small as 1 µm may allow in water or dust. The simplified geometry of the interfaces may increase a probability that such gaps do not occur. In some embodiments, the battery 112 may be sealed to the plastic housing 102. U.S. Pat. No. 9,269,935 ("'935 Patent"), entitled "Battery Pack with Integral Seal Member and Electronic Device Including the Same," granted on Feb. 23, 2016, which is incorporated by reference in its entirety, provides an example of the battery 112 being sealed to a metal housing, which can also be used with a plastic housing 102.

Figure 9:
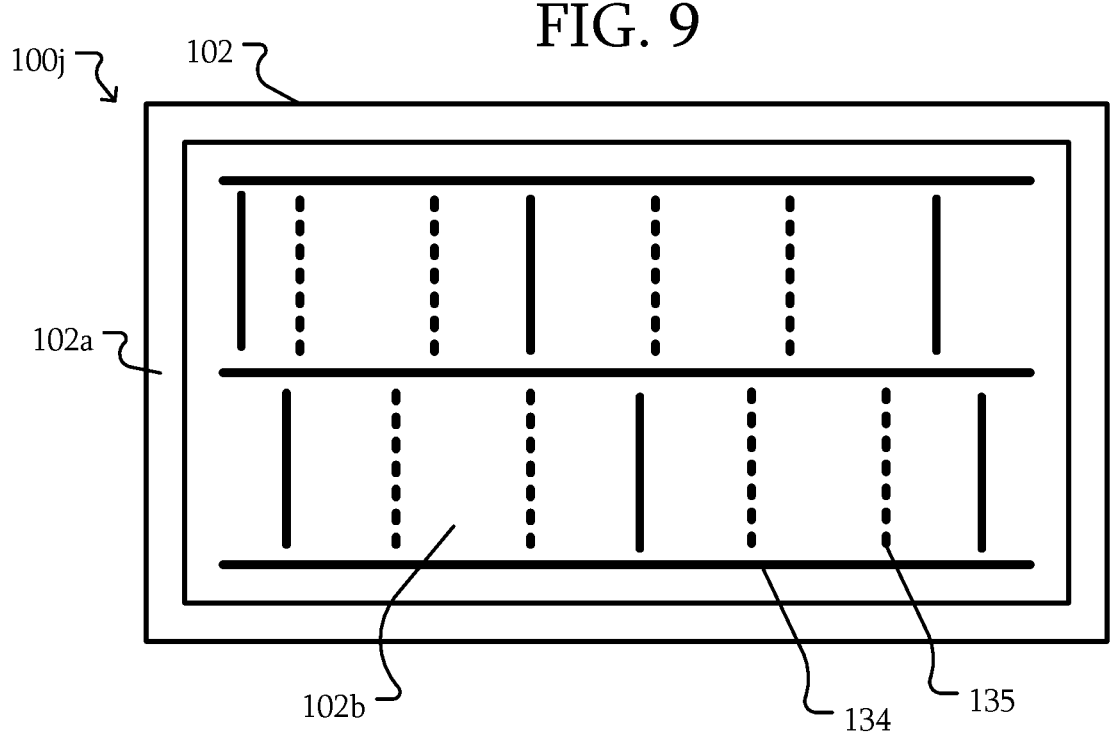
FIG. 9 is a block diagram of an x-ray detector with a plastic housing with at least one rigid component according to some embodiments.

FIG. 9 is a block diagram of an x-ray detector with a plastic housing with at least one rigid component according to some embodiments. In some embodiments, the x-ray detector 100j may be similar to the various x-ray detectors 100a-i described above. However, in the x-ray detector 100j, at least one rigid component 134 is attached to the plastic housing 102. The rigid component 134 may include a variety of forms, such as a bar, a beam, a rod, a plate, or the like.

In some embodiments, multiple rigid components 134 may be present. Here, nine rigid components 134 are used as an example. However, in other embodiments, the number and placement of the rigid components 134 may be different.

The rigid components 134 may be formed of a material that is mechanically stronger that plastic. For example, the rigid components 134 may be formed of carbon fiber, metal, or the like.

In some embodiments, ribs 135 or other similar structures may be formed as part of the plastic housing 102. That is, in various locations, a strip or other shape of plastic may extend from the base 102b. While the ribs 135 may increase a rigidity of the plastic housing 102, the increase may not be sufficient to achieve a desired rigidity. In some embodiments, the rigid components 134 may be added in conjunction with the ribs 135 to increase the rigidity.

In some embodiments, using the rigid components 134 may increase the static load the x-ray detector 100j may handle. For example, the increase may be about 50% or more. In a particular example, conventional x-ray detectors may have a point static load limit of about 100 kilograms (kg) and a distributed static load limit of 150 kg. Adding the rigid components 134 may increase the static load limits to 200 kg and 300, kg, respectively.

In some embodiments, the rigid components 134 may be distributed across the plastic housing 102 such that the rigid components 134 are evenly or uniformly spaced. Accordingly, the load transferred to the rigid components 134 may be substantially evenly distributed. However, in other embodiments, the rigid components 134 may be irregularly spaced, spaced to accommodate other internal structures, or the like.

Figure 10A:
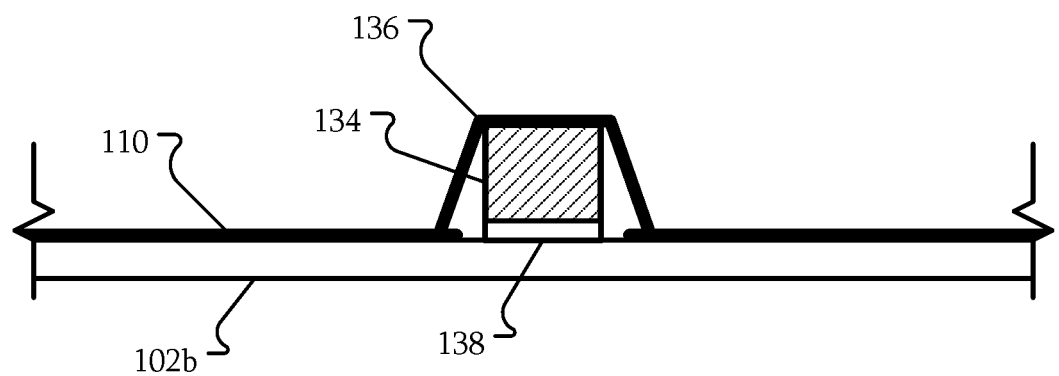
FIGS. 10A-10C are block diagrams of x-ray detectors with a plastic housing with at least one rigid component with conductive material according to some embodiments.
Figure 10B:
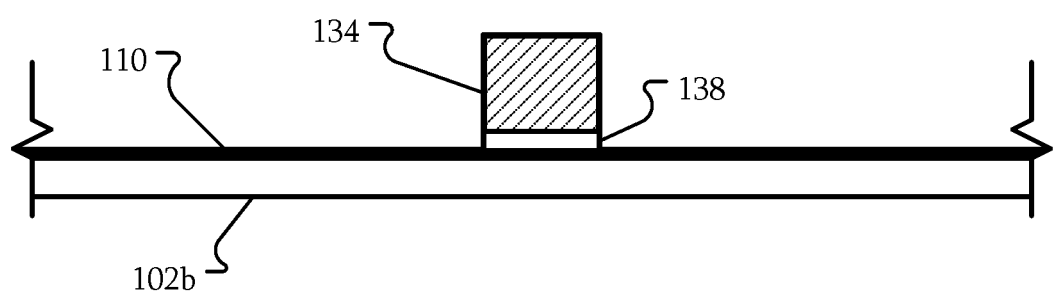
Figure 10C:
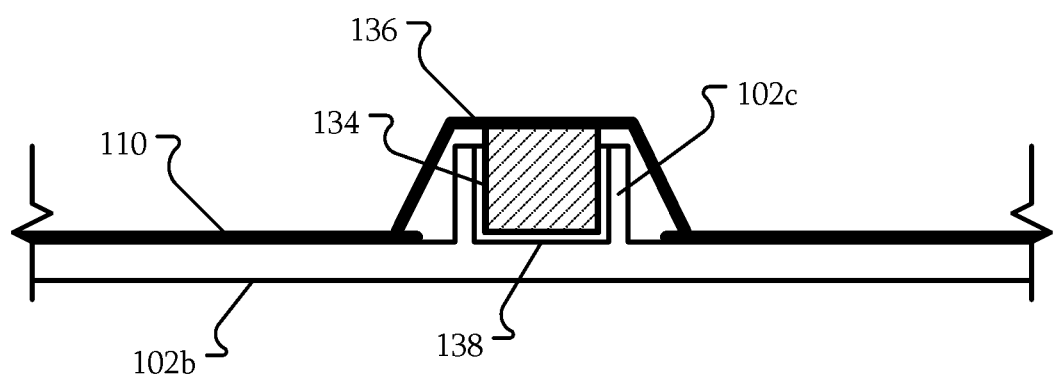

FIGS. 10A-10C are block diagrams of x-ray detectors with a plastic housing with at least one rigid component with conductive material according to some embodiments. While the cross section of the rigid component 134 shown in FIGS. 10A-10C is rectangular, the rigid component can have any type of cross section, such as elliptical, circular, triangular, polygonal, an I-beam, or the like. Referring to FIG. 10A, in some embodiments, the rigid component 134 may be attached directly to the plastic housing 102. Here, the rigid component 134 is attached to the base 102b of the plastic housing 102 by adhesive 138.

In some embodiments, the rigid component 134 may not be conductive. In addition, by directly attaching the rigid component 134 to the plastic housing 102, the non-conductive rigid component 134 may create a gap in an EMI shield. Accordingly, a conductive material 136 may be disposed on the rigid component 134 to cover the rigid component 134. The conductive material 136 may be electrically connected to the conductive coating 110. For example, the conductive material 136 may include conductive tape that covers the rigid component 134. In other embodiments, the rigid component 134 may be covered by a conductive epoxy. In other embodiments, the rigid component 134 may be covered by the conductive coating 110 itself.

In some embodiments, the conductive material covers all of a rigid component 134. In other embodiments, the conductive material 136 covers a sufficient amount of the rigid component 134 to maintain a desired level of EMI shielding.

Referring to FIG. 10B, in some embodiments, the rigid component 134 may be attached to the conductive coating 110. Here, the rigid component 134 is attached to the conductive coating 110 using the adhesive 138.

Referring to FIG. 10C, in some embodiments, the rigid component 134 may be embedded within a groove 102c or other structure of the plastic housing 102. The groove 102c may be similar to different from the ribs 135 described above. The rigid component 134 may be attached to the groove 102c using the adhesive 138. The rigid component 134, the groove 102c, and the like may be covered by the conductive material 136 similar to that described in FIG. 10A.

In the various embodiments described above, the rigid components 134 may be covered to maintain the EMI shield formed at least in part by the conductive coating 110 and the front plate 104.

Figure 11A:
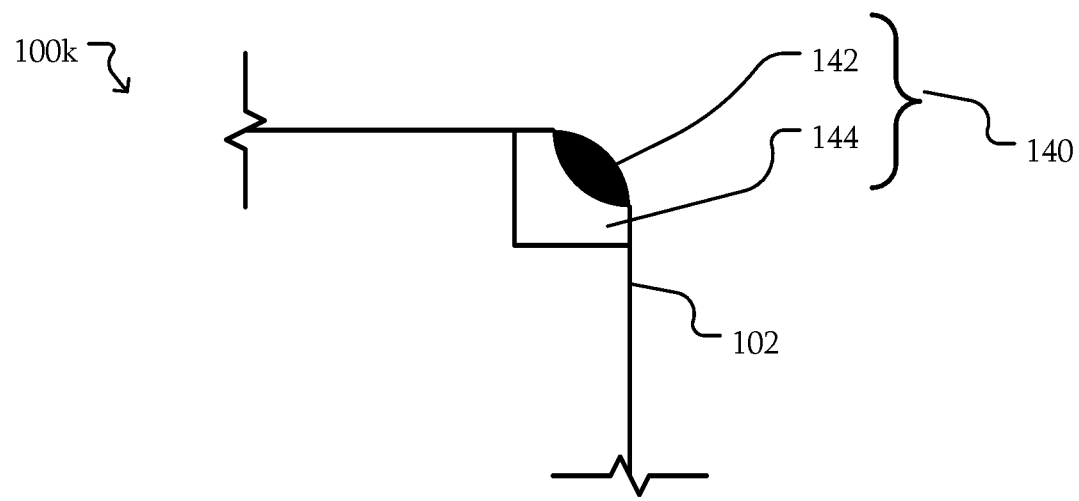
FIGS. 11A-11C are block diagrams of x-ray detectors with a plastic housing with corner bumpers according to some embodiments.
Figure 11B:
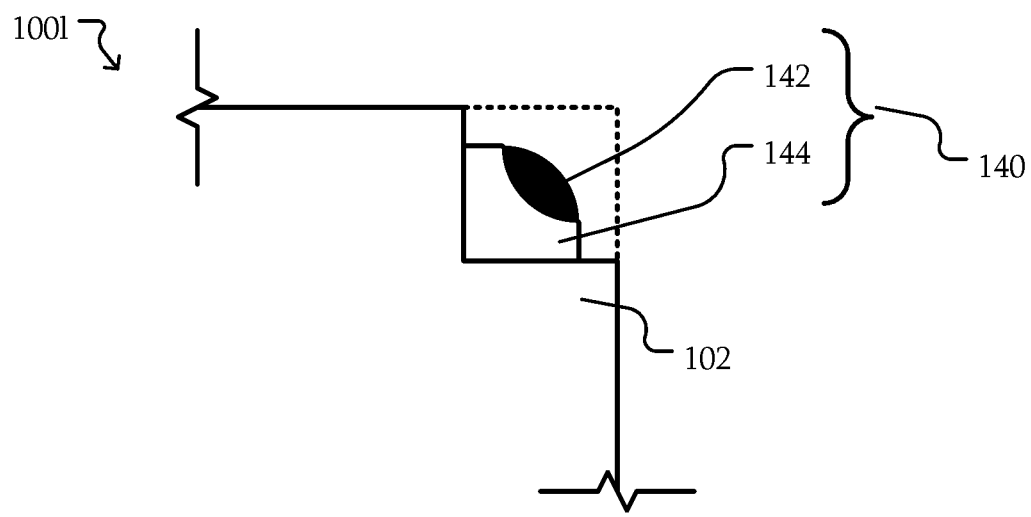
Figure 11C:
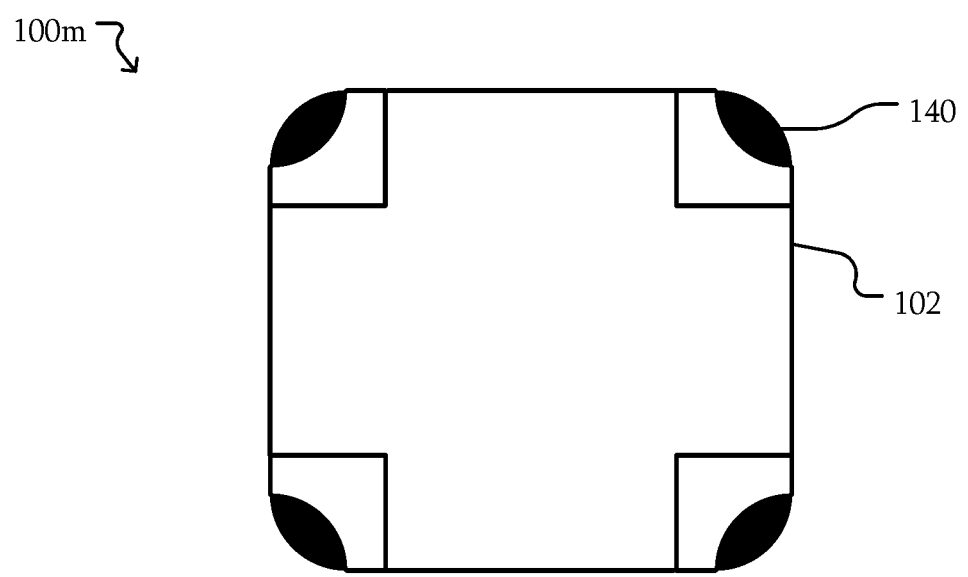

FIGS. 11A-11C are block diagrams of x-ray detectors with a plastic housing with corner bumpers according to some embodiments. Referring to FIG. 11A, in some embodiments, the x-ray detector 100k may be similar to the other x-ray detectors 100a-j described herein. However, the x-ray detector 100k includes at least one corner bumper 140. The corner bumper 140 is attached to the plastic housing 102. The corner bumper 140 includes a tip 142 and a body 144. The tip 142 is formed from a first material. The body 144 formed from a second material different from the first material. The tip 142 may be disposed at a distal end of the corner bumper 140 when installed on the plastic housing 102.

In some embodiments, the corner bumper 140 may be removably attached to the plastic housing 102. For example, a fastener (not illustrated) may attach the corner bumper 140 to the plastic housing 102. Thus, if the corner bumper 140 is damaged during an impact, the corner bumper 140 may be replaced.

In some embodiments, the first material may include a flexible material that may deform or spread under a load. In some embodiments, the first material may include an elastomeric plastic. In some embodiments, the first material of the tip 142 includes rubber. The first material may include a resilient material.

The second material may be more rigid than the first material. For example, the second material may include an impact-resistant plastic. The second material may be less likely to resiliently deform when under a load than to crack or fracture. In some embodiments, the second material may be similar or the same as the material of the plastic housing 102. In some embodiments, both the second material and the plastic housing 102 may include an impact-resistant plastic. However, in other embodiments, the second material may include the impact resistant plastic while the plastic housing 102 includes non-impact-resistant plastic.

The tip 142 and the body 144 may be integrally formed. For example, an overmold process may be used to mold the body 144 to the tip 142. As a result, a chemical bond may be formed between the two to transfer impacts between the two materials.

In some embodiments, the body 144 may include a sufficient amount of material to mount the corner bumper 140 to the plastic housing 102 and contain the tip 142 when deforming. The combination of the first and second materials may improve the impact resistance of the x-ray detector 100k. In particular, a resilient material may deform too much if used alone. Hard plastic may chip and bounce under an impact. The combination of the two may bounce somewhat, but the body 144 may contain the tip 142 and limit the deformation. As a result, the deformation of the tip 142 may lessen the impact but it may also be contained so that it does not deform enough to damage the front plate 104. For example, too much deformation of the tip 142 may contact the front plate 104 and cause delamination. By limiting the deformation, a probability of such delamination may be reduced or eliminated.

Referring to FIG. 11B, in some embodiments, the x-ray detector 100l is similar to the x-ray detector 100k. However, the corner bumper 140 does not extend beyond a rectangle coincident with each side of an outer perimeter of the plastic housing 102 in plan view. That is, the corner bumper 146 is slightly recessed into the plastic housing 102. As a result, when the x-ray detector 100l is placed in a bucky during use, the corner bumpers 140 may not interfere with the insertion. That is, the fit in the bucky may be controlled by the size of the x-ray detector 100l, not the size of the corner bumpers 140.

In some embodiments, the corner bumpers 140 are only disposed on the corners of the x-ray detector 100. However, in other embodiments, other similar structure may be formed on the sides of the x-ray detector 100, whether continuous along the side, continuous with the corner bumpers 140, periodically spaced, or the like.

Referring to FIG. 11C, in some embodiments, the x-ray detector 100m may be similar to the x-ray detector 100k or 100l. The x-ray detector 100m has a plastic housing 102 with a generally rectangular shape. The corner bumpers 140 may be disposed in the four corners of the plastic housing 102.

Figure 12:
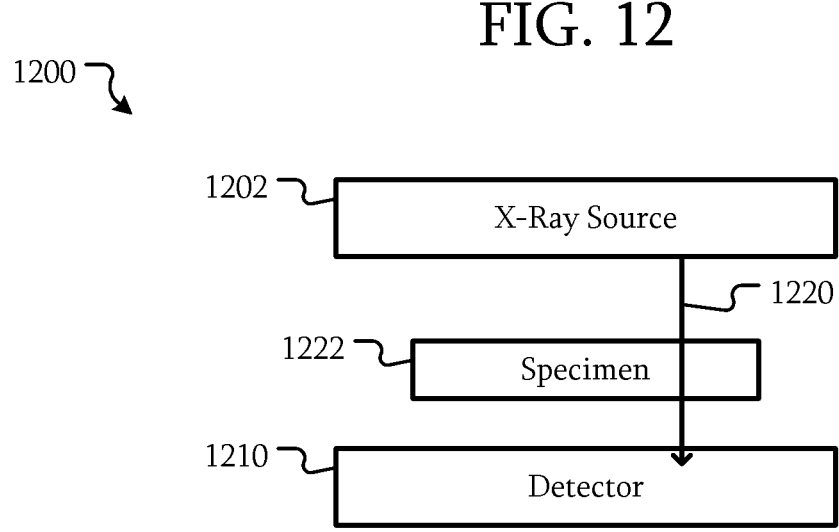
FIG. 12 is a block diagram of a 2D x-ray imaging system according to some embodiments.

FIG. 12 is a block diagram of a 2D x-ray imaging system according to some embodiments. The 2D x-ray imaging system 1200 includes an x-ray source 1202 and detector 1210. The detector 1210 may include an x-ray detector 100 or the like as described above. The x-ray source 1202 is disposed relative to the detector 1210 such that x-rays 1220 may be generated to pass through a specimen 1222 and detected by the detector 1210. In some embodiments, the detector 1210 is part of a medical imaging system. In other embodiments, the 2D x-ray imaging system 1200 may include a portable vehicle scanning system as part of a cargo scanning system.

As used herein an x-ray detector 100 refers to any of the x-ray detector 100a-m described above.

An x-ray detector, comprising: a plastic housing 102 including a conductive coating 110; a two-dimensional sensor array 108 disposed in a within the plastic housing 102 and configured to generate image data in response to incident x-rays; a front plate 104 connected to the plastic housing, the front plate 104 and the plastic housing 102 forming an enclosure surrounding the two-dimensional sensor array 108; wherein the conductive coating 110 and the front plate 104 form at least part of an electromagnetic interference shield around the two-dimensional sensor array 108.

In some embodiments, the enclosure meets or exceeds Ingress Protection Code IP67.

In some embodiments, the plastic housing 102 is a continuous structure with only a first opening configured to receive the front plate 104.

In some embodiments, the x-ray detector further comprises battery contacts 114; wherein: the plastic housing 102 is a continuous structure with only a first opening configured to receive the front plate 104 and a second opening; and the battery contacts 114 are disposed in the second opening.

In some embodiments, the conductive coating 110 comprises a conductive paint.

In some embodiments, the x-ray detector further comprises a coating 116 disposed on the conductive paint.

In some embodiments, the conductive paint comprises a copper paint, a silver paint, a nickel paint, or an alloy paint or a mixture paint of copper, silver, or nickel.

In some embodiments, the conductive coating 110 has a thickness between about 100 micrometers ($\mu m$) and 300 $\mu m$.

In some embodiments, the x-ray detector further comprises conductive straps 120 electrically connecting the conductive coating 110 to the two-dimensional sensor array 108.

In some embodiments, the x-ray detector further comprises a conductive elastically deformable material 122 electrically connected between the two-dimensional sensor array 108 and at least one of the conductive coating 110 and the front plate 104.

In some embodiments, the two-dimensional sensor array 108 is electrically connected to the electromagnetic interference shield through at least two electrical connections.

In some embodiments, the x-ray detector further comprises an antenna 124 electrically connected to the two-dimensional sensor array 108; wherein the antenna 124 is disposed within the enclosure such that a wall of the plastic housing 102 is disposed between the antenna 124 and a region external to the enclosure.

In some embodiments, the x-ray detector further comprises a conductive gasket 132 disposed between the front plate 104 and the plastic housing 102 and electrically connected to the front plate 104 and the conductive coating 110 and sealing an interface between the front plate 104 and the plastic housing 102.

In some embodiments, the x-ray detector further comprises at least one rigid component 134 attached to the plastic housing 102.

In some embodiments, the x-ray detector further comprises a conductive material 110, 136 covering the at least one rigid component 134 and electrically connected to the conductive coating 110.

In some embodiments, the at least one rigid component 134 is attached to the plastic housing 102 through an adhesive 138.

In some embodiments, the x-ray detector further comprises at least one corner bumper 140, each corner bumper 140 comprising: a tip 142 formed from a first material; and a body 144 formed from a second material different from the first material.

In some embodiments, the first material is rubber; and the second material is impact-resistant plastic.

In some embodiments, for each corner bumper 140: the corner bumper 140 is integrally formed.

In some embodiments, for each corner bumper 140: the corner bumper 140 is removably attached to the plastic housing 102.

In some embodiments, for each corner bumper 140: the corner bumper 140 is entirely within a rectangle coincident with each side of an outer perimeter of the plastic housing 102 in plan view.

Some embodiments include a method of forming an x-ray detector, comprising: providing a plastic housing 102; applying a conductive coating 110 to the plastic housing 102; attaching a two-dimensional sensor array 108 configured to generate image data in response to incident x-rays to the plastic housing 102; forming an enclosure surrounding the two-dimensional sensor array 108 using the plastic housing 102 and a front plate 104; and electrically connecting the two-dimensional sensor array 108 to the conductive coating 110.

Some embodiments include an n x-ray detector, comprising: a plastic housing 102 including at least one rigid component attached to the plastic housing 102; a two-dimensional sensor array 108 disposed in a within the plastic housing 102 and configured to generate image data in response to incident x-rays; a front plate 104 connected to the housing, the front plate 104 and the plastic housing 102 forming an enclosure surrounding the two-dimensional sensor array 108.

Some embodiments include an x-ray detector, comprising: means for generating image data in response to x-rays; non-conductive means for supporting the means for generating the image data in response to the x-rays; means for forming an enclosure with the non-conductive means for supporting; electrically conductive means conformably disposed on the non-conductive means for shielding the means for generating the image data in response to the x-rays within the enclosure from electromagnetic interference.

Examples of the means for generating image data in response to x-rays include the two-dimensional sensor array 108.

Examples of the non-conductive means for supporting the means for generating the image data in response to the x-rays include plastic housing 102.

Examples of the means for forming an enclosure with the non-conductive means for supporting include front plate 104.

Examples of the electrically conductive means conformably disposed on the non-conductive means for shielding the means for generating the image data in response to the x-rays within the enclosure from electromagnetic interference include the conductive coating 110 and the conductive material 136.

In some embodiments, the x-ray detector further comprises means for conductively coating the non-conductive means for supporting. Examples of the means for conductively coating the non-conductive means for supporting include the conductive paint.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An x-ray detector, comprising:
   a plastic housing including a conductive coating and a groove in the plastic housing disposed along a perimeter of the plastic housing;
   a two-dimensional sensor array disposed within the plastic housing and configured to generate image data in response to incident x-rays;
   a front plate connected to the plastic housing, the front plate and the plastic housing forming an enclosure surrounding the two-dimensional sensor array; and
   a conductive gasket disposed in the groove of the plastic housing between the front plate and the plastic housing and electrically connected to the front plate and the conductive coating and sealing an interface between the front plate and the plastic housing;
   wherein the conductive coating and the front plate form at least part of an electromagnetic interference shield around the two-dimensional sensor array.

2. The x-ray detector of claim 1, wherein:
   the enclosure is submersible for at least 30 minutes at 1 meter.

3. The x-ray detector of claim 1, further comprising:
   battery contacts;
   wherein:
      the plastic housing is a continuous structure with only a first opening configured to receive the front plate and a second opening; and
      the battery contacts are disposed in the second opening.

4. The x-ray detector of claim 1, wherein:
   the conductive coating comprises a conductive paint.

5. The x-ray detector of claim 4, further comprising:
   a coating disposed on the conductive paint.

6. The x-ray detector of claim 4, wherein:
   the conductive paint comprises a copper paint, a silver paint, a nickel paint, or an alloy paint or a mixture paint of copper, silver, or nickel.

7. The x-ray detector of claim 1, wherein:
   the conductive coating has a thickness between about 100 micrometers (μm) and 300 μm.

8. The x-ray detector of claim 1, further comprising:
   a conductive elastically deformable material electrically connected between the two-dimensional sensor array and at least one of the conductive coating and the front plate.

9. The x-ray detector of claim 1, wherein:
   the two-dimensional sensor array is electrically connected to the electromagnetic interference shield through at least two electrical connections.

10. The x-ray detector of claim 1, further comprising:
    an antenna electrically connected to the two-dimensional sensor array;
    wherein the antenna is disposed within the enclosure such that a wall of the plastic housing is disposed between the antenna and a region external to the enclosure.

11. The x-ray detector of claim 1, further comprising:
    at least one rigid component disposed on the plastic housing and configured to increase a rigidity of the plastic housing.

12. The x-ray detector of claim 11, further comprising:
    a conductive material covering the at least one rigid component and electrically connected to the conductive coating.

13. The x-ray detector of claim 1, further comprising:
    at least one corner bumper, each corner bumper comprising:
       a tip formed from a first material; and
       a body formed from a second material different from the first material.

14. The x-ray detector of claim 13, wherein:
    the first material is rubber; and
    the second material is impact-resistant plastic.

15. The x-ray detector of claim 13, wherein for each corner bumper:
    the corner bumper is integrally formed.

16. The x-ray detector of claim 13, wherein for each corner bumper:
    the corner bumper is removably attached to the plastic housing.

17. A method of forming an x-ray detector, comprising:
    providing a plastic housing including a groove in the plastic housing disposed along a perimeter of the plastic housing;
    applying a conductive coating to the plastic housing;
    attaching a two-dimensional sensor array configured to generate image data in response to incident x-rays to the plastic housing;
    forming an enclosure surrounding the two-dimensional sensor array using the plastic housing and a front plate, including placing a conductive gasket in the groove of the plastic housing between the front plate and the plastic housing;
    electrically connecting the front plate and the conductive coating and sealing an interface between the front plate and the plastic housing with the conductive gasket; and
    electrically connecting the two-dimensional sensor array to the conductive coating.

* * * * *